A. WINTON.
CONTROLLER FOR MOTOR VEHICLES.
APPLICATION FILED JULY 19, 1907.
972,047.
Patented Oct. 4, 1910.
2 SHEETS—SHEET 1.
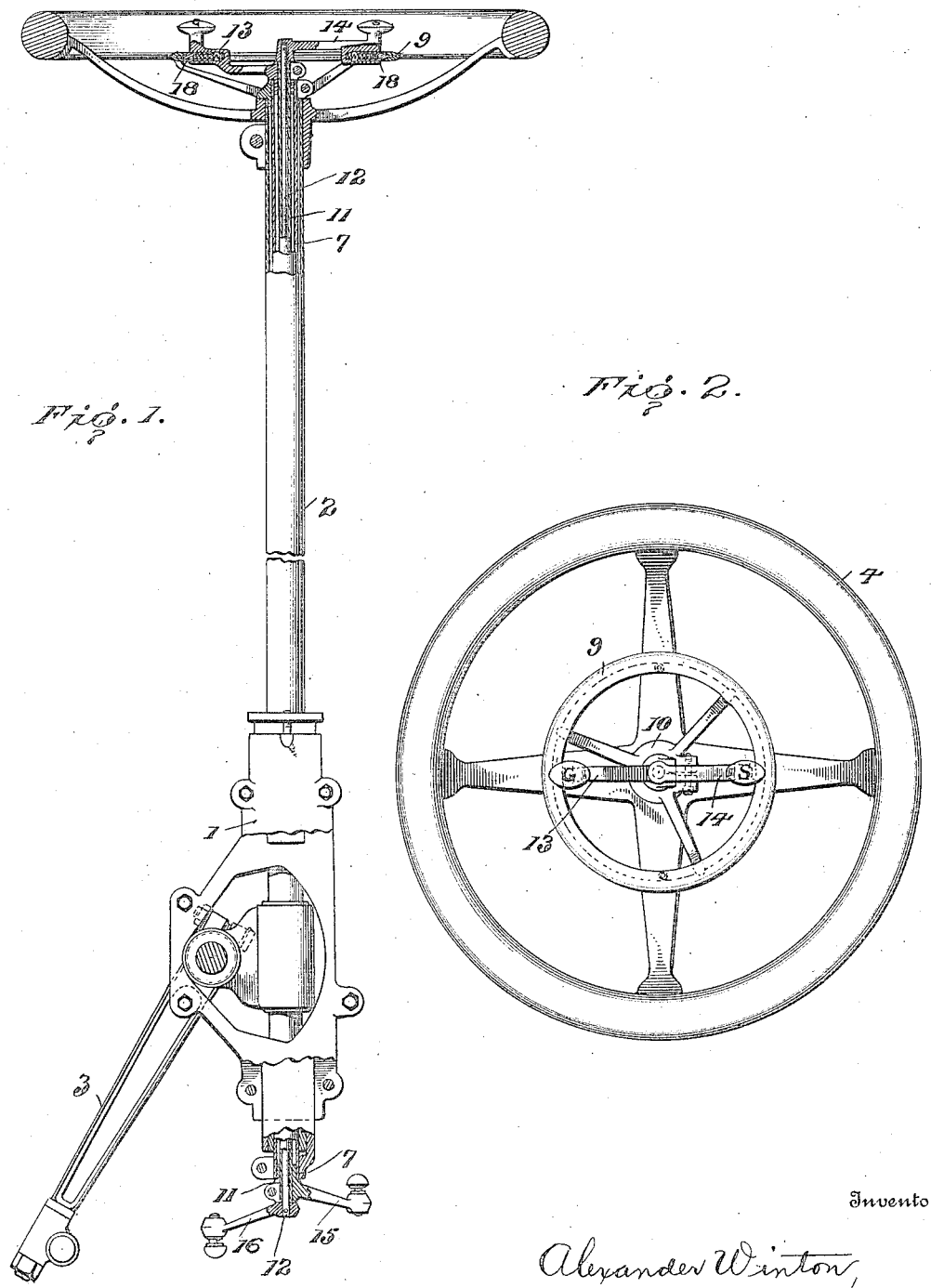

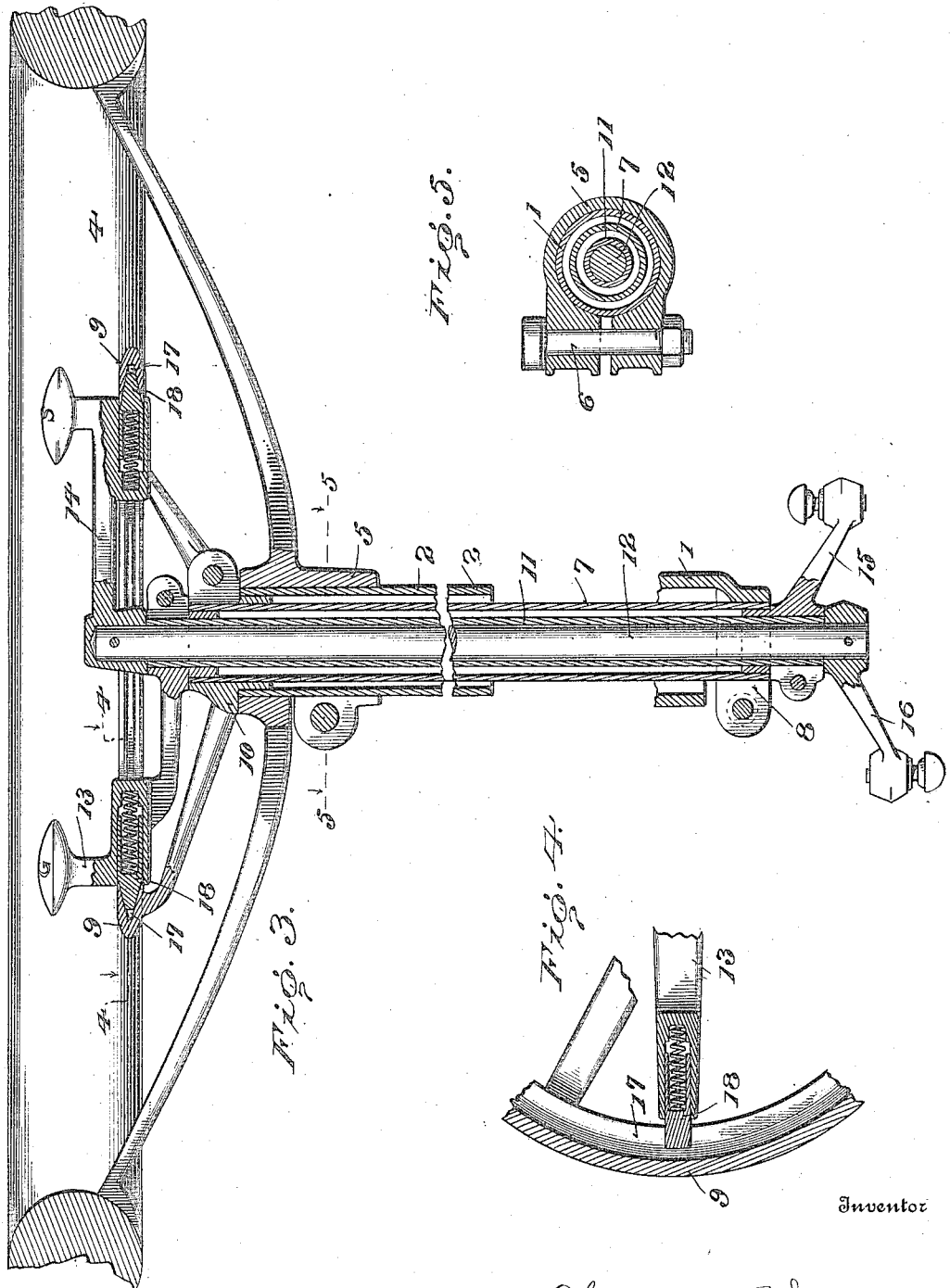

UNITED STATES PATENT OFFICE.

ALEXANDER WINTON, OF CLEVELAND, OHIO.

CONTROLLER FOR MOTOR-VEHICLES.

972,047.  Specification of Letters Patent.  Patented Oct. 4, 1910.

Application filed July 19, 1907. Serial No. 384,576.

*To all whom it may concern:*

Be it known that I, ALEXANDER WINTON, citizen of the United States, residing at Cleveland, in the county of Cuyahoga and State of Ohio, have invented certain new and useful Improvements in Controllers for Motor-Vehicles, of which the following is a specification, reference being had therein to the accompanying drawing.

This invention relates to improvements in controllers for motor vehicles, and pertains to a specific arrangement and construction of controlling levers combined with an arranged adjacent to the steering wheel of the vehicle.

In the accompanying drawings, Figure 1, is a side elevation, partly in section, of a steering post and wheel, with the present invention applied thereto. Fig. 2 is a top plan view of Fig. 1. Fig. 3, is an enlarged vertical section taken centrally through the steering tube or post, with the separate portions of the steering post removed. Fig. 4, is a horizontal sectional view on the line 4—4 of Fig. 3. Fig. 5, is a horizontal section on the line 5—5 of Fig. 3.

In carrying out the present invention a casting or box 1 is secured to the vehicle frame or floor in any suitable manner. A revoluble steering tube 2 is mounted within this casing or box 1 and through suitable intermediate mechanism (not here shown, as it forms no part of this invention) the rotation of the tube 2 causes the lever 3 to rock, and this lever 3 is connected with the steering wheels of the vehicle in a manner understood and well known by those skilled in this art, and is not here shown because it forms no part of the present invention. The steering wheel 4 has its hub 5 clamped to the steering tube 2 by means of a clamping bolt 6, as clearly shown in Figs. 1 and 5. Passing through this steering tube 2 is a controller supporting tube 7, and this tube 7 extends through the casing or box 1 and is clamped by the lower end of the casing, as shown at 8, by a clamping construction like that shown in Fig. 5. By this arrangement the controller supporting tube 7 is held against rotation and is firmly secured to the box 1.

A controller circle 9 has its hub 10 clamped to the upper projecting end of the controller supporting tube 7 by a clamping arrangement similar to that shown in Fig. 5, and this tube 7 serves to hold the controller circle 9 against rotation, and independent of the steering wheel 4.

Passing through and rotatably supported within the controller supporting tube 7 is a controller tube 11, and passing through and rotatably supported in the controller tube 11 is a central or second controller member, here shown in the form of a rod 12. As shown, the controller tube 11 projects above the hub 10 of the controller circle 9, and clamped to this projecting end of the tube 11 is a controlling handle 13. The rod 12 projects above the clamping portion of the controller lever 13 and has secured thereto a controller lever or handle 14. The lower end of the controller tube 11 projects beyond the supporting tube 7 and has secured thereto an arm 15, and the rod 12 projects below the tube 11 and has secured thereto an arm 16. These arms 15 and 16 are respectively connected in any suitable manner with the throttle and spark advancing mechanism (not shown) for controlling an explosive engine in a manner well understood by those skilled in this art.

The controlling circle 9 performs two functions, one function being to hold the controller handles 13 and 14 in their adjusted position, and the other function is to act as an index segment for the operator. The first function is accomplished by providing the inner edge of the circle 9 with a wedge-shaped groove 17 and the controller handles 13 and 14 with spring-actuated wedge-shaped plungers 18 which, by a friction-wedging action, serves to hold the handles in their adjusted position, while at the same time permitting them to be moved smoothly and to any desired adjustment.

Attention is directed to the fact that the controlling handles 13 and 14 are located on opposite sides of the center or axis of the controller circle 9, whereby confusion in the operation of these handles is avoided, which is likely to occur where the handles are located on the same side of the center of the controller circle or segment, and therefore on the same side of the axis of the steering wheel. By this arrangement any interference in the operation of these levers is prevented. Where the handles or levers are located on the same side of the axis of the steering wheel, one lever is often moved past the other, and it is then necessary for the operator to be careful not to have his hand interfere with the lever it is not desired to move, which is obviated in this arrangement.

While the member 9 is here shown in the form of a complete circle, it will be understood by those skilled in the art that it may be made segmental, and wherever the term "circle" is used in the specification or claims, it is to be interpreted as including a segment; likewise the location of the friction surface or groove 17 may be changed without departing from the present invention, the main feature being the provision of a friction surface, and a suitable location of the friction plunger to co-act therewith, although the location of the friction surface and plunger here shown is that preferred as the most convenient and the most effective.

Having thus described this invention, what is desired to be claimed and secured by Letters Patent, is:—

1. The combination with the steering wheel of a motor vehicle, of a stationary concentrically-arranged controller circle having in its edge a smooth walled groove, of two separate controller levers projecting in opposite directions from the axis of the steering wheel, each lever having a spring projected plunger extending into and slidably engaging the wall of said groove for the purpose described.

2. The combination with the steering wheel of a motor vehicle, of a stationary concentrically arranged controller circle having a V-shaped smooth walled groove in its edge, of two separate controller levers each having a V-shaped spring projected plunger entering and slidably engaging the wall of said groove for the purpose described.

In testimony whereof I affix my signature in presence of two witnesses.

ALEXANDER WINTON.

Witnesses:
O. F. BAUGHMAN,
C. B. LINCOLN.